(No Model.)
B. H. COLBY.
PROTRACTOR.
No. 507,216. Patented Oct. 24, 1893.
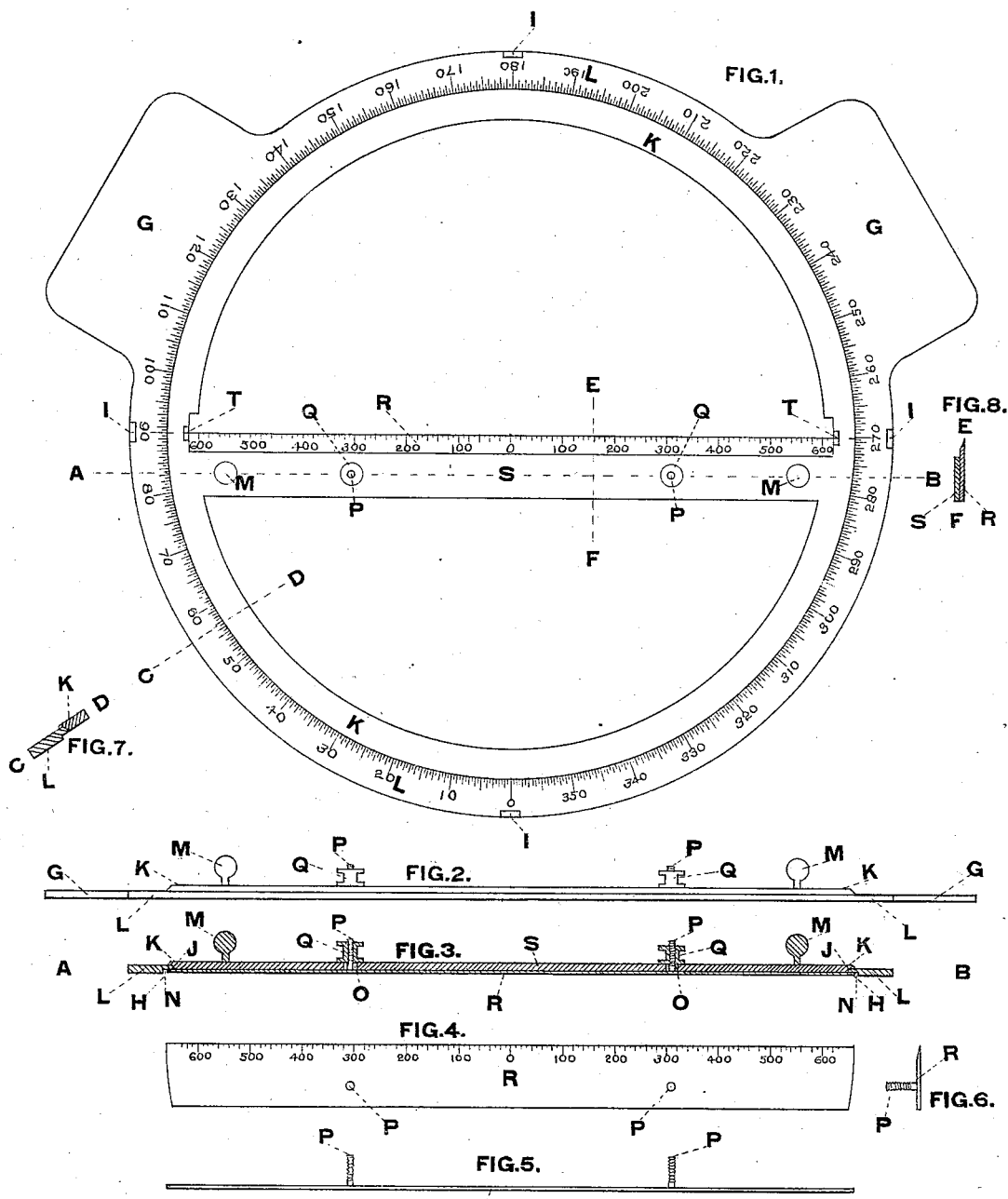
Witnesses,
Chester B. White
J. M. Roche
Inventor,
Branch Harris Colby

UNITED STATES PATENT OFFICE.

BRANCH HARRIS COLBY, OF ST. LOUIS, MISSOURI.

PROTRACTOR.

SPECIFICATION forming part of Letters Patent No. 507,216, dated October 24, 1893.

Application filed October 1, 1891. Serial No. 407,367. (No model.)

*To all whom it may concern:*

Be it known that I, BRANCH HARRIS COLBY, a citizen of the United States, residing at St. Louis, in the State of Missouri, have invented a new and useful Protractor, of which the following is a specification.

My invention relates to improvements in protractors whereby a scale, attached to but detachable from, a ridged cross arm, forming part of a circular ring, is made to revolve inside of a graduated limb having no fixed center but so constructed that the zero of scale, when adjusted, will always remain in center of the limb during revolution of the scale and circular ring.

The objects of my invention are, first, to construct a protractor without a fixed center, thereby leaving all the space inside the limb available for plotting; second, to attach a scale to the cross arm of a revolving circular ring, in such a manner that the zero of the scale will always remain in the center of the circular ring; third, to combine a circular ring with scale attached to a cross arm, with a graduated limb, in such a manner that the zero of the scale will always remain in the center of the limb when revolved; fourth, to provide means for attaching, adjusting and detaching different scales to the cross arm of a circular ring; fifth, to substitute lead weights for the muscular force heretofore required to hold a protractor in position while in use; sixth, to provide a simple device for fastening limb to rest of the protractor; seventh, to construct a protractor in such a manner that when any required angle is turned off upon the limb, the zero of a graduated scale will always be at the center of the limb of protractor. I attain these objects by the mechanism illustrated in the accompanying drawings, in which—

Figure 1 is a horizontal and Fig. 2 a vertical projection of the complete protractor; Fig. 3 a cross section through A B; Figs. 4, 5 and 6 projections of the detachable scale, showing top side, edge, and end respectively; Fig. 7 a cross section through C D; and Fig. 8 a cross section through E F.

Similar letters refer to similar parts throughout the several views.

L, L, is the limb, graduated, as desired, into fractions of degrees and having four indices I, I, I, I, ninety degrees apart.

G, G, are two ears made solid with the limb L, L, and for the purpose of receiving lead weights to hold protractor in position while in use. The inside of limb L, L, has beveled edge H, H, Fig. 3, to receive beveled edge J, J, of circular ring K, K, and has a portion of the bottom side of its inner edge N, N, Fig. 3, cut away to allow ends of scale R to underlap upper portion of limb L, L, thus fastening circular ring K, K, with cross arm S and scale R to limb L, L, to prevent separation of parts of protractor by lifting upon handles M, M.

The construction of the limb, as above described, accomplishes the first object of my invention.

The second and third objects are secured by means of the holes O, O, Fig. 3, the screws P, P, and the milled headed nuts Q, Q, as follows: The screws P, P, are securely fastened to the scale R and pass through the holes O, O, in the cross arm S and are received by the nuts Q, Q, which upon being tightened, securely clamp the scale R to the cross arm S; the holes O, O, being considerably larger in diameter than the screws P, P, allow the entire scale R to move freely, for a short distance, in any direction, thus allowing the graduated edge of scale R to be adjusted in true line between indices T, T, on inner edge of circular ring K, K, and the zero of scale R to be brought into true center of limb L, L, and center of circular ring S. It being evident that any number of scales, of similar construction to R but differently graduated, can be attached to the cross arm S by means of the nuts Q, Q, my fourth object is thus attained.

The fifth object of my invention is attained by the ear pieces G, G, made solid as a part of the limb L, L, it being only necessary to place lead weights upon the ear pieces G, G, to hold the entire protractor securely in position while in use.

My sixth object is secured by cutting away from the limb, L, L, a portion, N, N, Fig. 3, and allowing the scale R to underlap the limb L, L, and passing the screws P, P, through the holes O, O, in cross arm S and clamping scale R to cross arm S by means of the nuts Q, Q.

My seventh object is accomplished by making the beveled edge J, J, of circular ring K, K, fit the inner edge H, H, of limb L, L, Fig. 3, and by adjusting the scale R to cross arm S in the manner described.

Having thus fully described my invention, what I claim, and desire to secure by Letters Patent of the United States, is—

1. The combination, in a protractor, of the circular ring having the indices T, T, the cross-arm S attached to said ring and having the holes O, O, and the scale R, screws P, P, and the nuts Q, Q, said holes being larger than said screws, substantially as and for the purpose set forth.

2. The combination, in a protractor, of the ring K, having the indices T, T, the cross-arm S attached to and movable with said ring, and the scales, said scale being attachable to, and adjustable upon, said cross-arm, for the purpose described.

3. In a protractor, the circular limb having the ears G, G, said ears lying wholly outside of the path of the movable parts of the protractor, substantially as described.

4. In a protractor, the combination of the limb, the ring K, and the scale, said scale being attachable to, and adjustable upon, a part of said ring, for the purpose described.

5. In a protractor, the combination of the circular limb, the scale, and the scale-support, said scale and support being wholly within the graduation upon said limb, substantially as described.

6. The combination, in a protractor, of the circular limb, the scale, and the scale-support, said support being revoluble within said limb, and said scale being attachable to, and adjustable upon, said support, substantially as described.

BRANCH HARRIS COLBY.

Witnesses:
CHESTER B. WHITE,
J. M. ROCHE.